(12) United States Patent
Reid et al.

(10) Patent No.: US 8,385,638 B2
(45) Date of Patent: Feb. 26, 2013

(54) DETECTING SKIN TONE IN IMAGES

(75) Inventors: Russell Reid, Palo Alto, CA (US); Nikhil Bhatt, Cupertino, CA (US)

(73) Assignee: Apple Inc., Cupertino, CA (US)

(*) Notice: Subject to any disclaimer, the term of this patent is extended or adjusted under 35 U.S.C. 154(b) by 1040 days.

(21) Appl. No.: 12/360,112

(22) Filed: Jan. 26, 2009

(65) Prior Publication Data

US 2010/0172578 A1    Jul. 8, 2010

Related U.S. Application Data

(60) Provisional application No. 61/142,606, filed on Jan. 5, 2009.

(51) Int. Cl.
*G06K 9/00* (2006.01)

(52) U.S. Cl. .......... 382/165; 382/162

(58) Field of Classification Search .......... None
See application file for complete search history.

(56) References Cited

U.S. PATENT DOCUMENTS

| | | | |
|---|---|---|---|
| 7,190,829 B2* | 3/2007 | Zhang et al. | 382/165 |
| 7,916,905 B2* | 3/2011 | Yen et al. | 382/118 |
| 7,929,771 B2* | 4/2011 | Ko et al. | 382/190 |
| 2003/0179911 A1 | 9/2003 | Ho et al. | |
| 2005/0031173 A1* | 2/2005 | Hwang | 382/118 |
| 2006/0029265 A1 | 2/2006 | Kim et al. | |
| 2006/0204034 A1* | 9/2006 | Steinberg et al. | 382/103 |
| 2007/0110305 A1 | 5/2007 | Corcoran et al. | |
| 2008/0056580 A1* | 3/2008 | Okada et al. | 382/190 |

FOREIGN PATENT DOCUMENTS

EP    1128316 B1    2/2006

OTHER PUBLICATIONS

Chiarizia, Brigitte, Examiner, European Patent Office, PCT Patent Application PCT/US2010/020141, Filed Jan. 5, 2010, in International Search Report and the Written Opinion of the International Searching Authority, mailed Mar. 29, 2010, pp. 26.

Jin et al: "Face detection using template matching and skin-color information" Neurocomputing, Elsevier Science Publishers, Amsterdam, NL, vol. 70, No. 4-6, Jan. 9, 2007, pages.

* cited by examiner

*Primary Examiner* — Li Liu

(74) *Attorney, Agent, or Firm* — Wong, Cabello, Lutsch, Rutherford & Brucculeri, LLP

(57) ABSTRACT

One aspect of the subject matter described in this specification can be implemented in a method that includes sampling an image to generate a sample portion; evaluating pixels in the sample portion to determine whether the pixels correspond to skin tone colors; generating, based on the determination, a skin tone result indicating a confidence level that the received image includes a depiction of human skin; and providing the skin tone result to an image management application to indicate a likelihood the image depicts a human face.

28 Claims, 7 Drawing Sheets

DETECTING SKIN TONE IN IMAGES

This application claims the benefit of U.S. Provisional Application No. 61/142,606, filed Jan. 5, 2009.

TECHNICAL FIELD

The present disclosure relates to detecting skin tone in images, such as to determine whether an image depicts a person's face.

BACKGROUND

Digital photography, a popular pastime, utilizes digital technology to produce digital images. Digital images (or "images") also can be created, for example, by graphical editing software (e.g., photo editing or drawing software), digital video equipment, and scanners.

After production, an original image (e.g., a photograph) can be processed. Some instances of image processing can produce a new image from an original image. For example, cropping (i.e., extracting a portion of an image) can produce a new image from an original image. Other instances of image processing can ascertain information about an original image without producing a new image. For example, facial-detection processing can determine whether an image depicts one or more faces.

Images can depict visual information using various color models. A color model can describe the way colors are represented, e.g., using one to four values representing color components. For example, in a red-green-blue (RGB) color model, a color can be described using three values—one each for red, green, and blue. Thus, three values can be used to describe the color of each pixel in an RGB image. When an intended interpretation of a color model's components is known, the set of possible colors can be referred to as a color space. For example, the three values associated with an RGB color can be mixed additively to produce a specific color in an RGB color space.

SUMMARY

This disclosure describes technologies and techniques for detecting skin tone in images. Skin tone can correspond to a color or set of colors within a color space that are characteristic of human flesh. Detecting skin tone in an image can include ascertaining whether an image depicts such characteristic colors.

A facial detection system or application can provide an indication that a face is believed to be depicted in an image or a portion of an image. The present inventors recognized a need to assess the accuracy of a detection made by such a facial detection system. Further, the need to determine whether an image represents one or more skin tone colors was recognized. Additionally, the need to discount a facial detection in an image that does not represent one or more skin tone colors was recognized. The need to eliminate or ignore indications of facial detections in images not corresponding to facial representations in an overall facial correlation system further was recognized. In general, one aspect of the subject matter described in this specification can be implemented in a method that includes sampling an image to generate a sample portion; evaluating pixels in the sample portion to determine whether the pixels correspond to skin tone colors; generating, based on the determination, a skin tone result indicating a confidence level that the received image includes a depiction of human skin; and providing the skin tone result to an image management application to indicate a likelihood the image depicts a human face.

These and other implementations can optionally include one or more of the following features. The sampling the image further can include identifying a region substantially one third as wide as the image, substantially centered horizontally relative to the image, substantially one third as tall as the image, and offset below vertically centered relative to the image. The evaluating pixels further can include converting a selected pixel to a normalized red-green color space; and comparing the selected pixel to a predetermined skin tone region in the normalized red-green color space. The evaluating pixels further can include generating a skin tone pixel count by comparing the pixels to a predetermined skin tone region in a color space. The evaluating pixels further can include comparing the skin tone pixel count to a count of the pixels to generate a skin tone percentage; and determining, based on the skin tone percentage and a predetermined skin tone percentage threshold, that the sample portion includes a depiction of human skin. The generated skin tone result can include an indication that the image is suitable for facial recognition processing.

The techniques described in this specification can be implemented to realize one or more of the following advantages. In general, the presence or absence of a human face (or "face") in an image can be detected. Thus, the accuracy of facial detection and recognition can be improved. In specific, facial detection accuracy can be improved by eliminating or ignoring indications of facial detections in images not representing one or more skin tone colors.

Further, techniques described in this specification also can be implemented to realize one or more of the following advantages. Skin tone detection can be accurately performed despite the presence of objects, e.g., hats, glasses, goggles and other such accessories, depicted relative to a face. Skin tone detection also can be performed accurately regardless of skin color differences (e.g., based on race), lighting conditions, and facial hair. Aspects of skin tone detection can permit efficient production of implementations, and production of efficiently performing implementations. Efficient facial detection implementations can increase overall processing-resource efficiency and can be used in real-time systems. A skin tone detection process also can be configured to recognize images having artificially modified color environments (e.g., black and white, or sepia) such that a positive assertion that a person is not depicted in such images can be avoided.

The details of one or more implementations are set forth in the accompanying drawings and the description below. Other features and advantages will be apparent from the description and drawings, and from the claims.

BRIEF DESCRIPTION OF THE DRAWINGS

Like reference symbols indicate like elements throughout the specification and drawings.

DETAILED DESCRIPTION

Facial detection processing can include detecting faces in images. Facial recognition processing can include determining, based on a detected face, which person is represented. A facial detection process can determine if an image includes face-like patterns. However, facial recognition can be inaccurate based on certain detection conditions. For example, facial detection processing can detect a face in an image or image portion that actually depicts something other than a face (e.g., clouds or leaves on a tree). Combining a result generated by skin tone detection processing with facial detection processing can improve the likelihood that a positive detection in fact represents a face.

Figure 1:
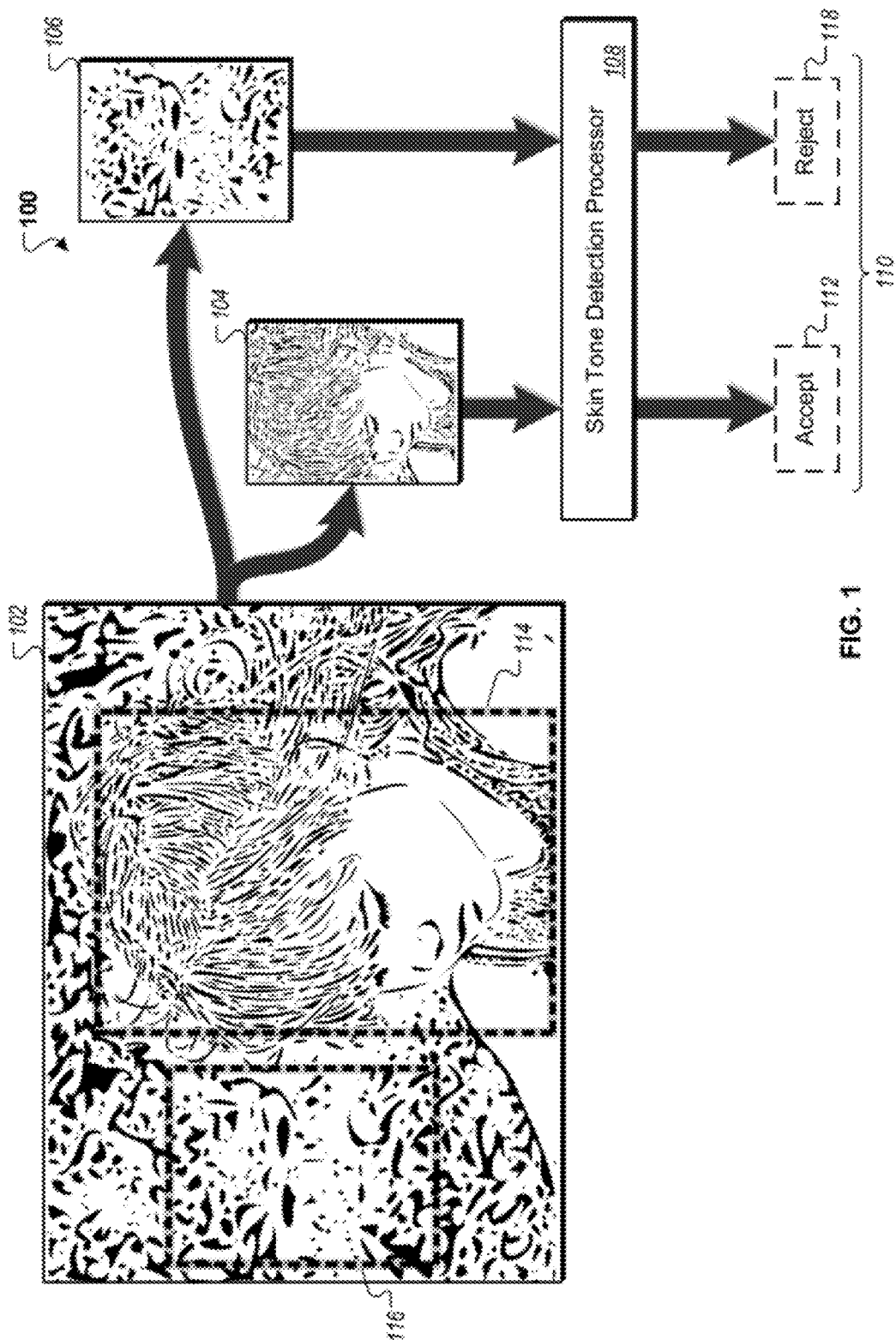
FIG. 1 shows an exemplary overview of detecting skin tone.

In general, as shown in FIG. 1, an image can be processed to detect skin tone. A facial detection process can determine that a given candidate region of the image includes a depiction of a face (e.g., using spatial pattern recognition). An identified candidate region can be processed to detect whether color information representative of skin tone is present. Further, the relative amount of skin tone colors compared to non-skin tone colors in candidate regions can be used to determine a likelihood candidate regions depict faces.

FIG. 1 shows an exemplary overview 100 of detecting skin tone. The overview 100 includes an original image 102. The original image 102 can be a digital image which depicts visual information such as representations of people, plants, and animals.

A first candidate region 114 of the original image 102 can be a region in which a face has been detected by a facial detection process. In some implementations, the first candidate region can be a facial-detection rectangle. In the case of the original image 102, the first candidate region 114 includes a depiction of a face of a young girl. The coordinates of the first candidate region 114 can be provided by the facial detection process. The coordinates also can be calculated (e.g., by the skin tone detection processor 108) based on information provided by the facial detection process (e.g., coordinates of facial features such as eyes, nose, and mouth, and an angle of the face).

A second candidate region 116 of the original image 102 also can be a region in which a face has been detected by a facial detection process. However, the second candidate region 116 does not depict a person's face.

Facial detection can be performed without regard to color (e.g., using a grayscale version of an image). Using, e.g., spatial pattern recognition, a facial detection process can detect a supposed face based on depictions (e.g., dark areas) that coincidently have a face-like pattern (e.g., approximating eyes, nostrils, and a mouth) but that do not actually depict a face. The second candidate region 116 includes dark regions that a facial detection process could mistake for eyes, a nose, and nostrils. In reality, however, the second candidate region 116 depicts foliage having a coincidentally face-like pattern. A facial detection process also can detect actual facial patterns and features that do not correspond to human faces (e.g., animals, statues, or cartoons).

A face image 104 can be an extraction from the original image 102, corresponding to the first candidate region 114. The face image 104 can substantially depict a single face. The face image 104 can be produced by a facial detection process or based on information provided by a facial detection process, such as coordinates or other data defining an area. In addition, the face image 104 also can be an indicated portion of the original image 102 rather than a separate image (e.g., a distinct file or memory buffer).

The foliage image 106 can be produced or indicated similarly to the face image 104, although corresponding to the second candidate region 116.

A skin tone detection processor 108 can receive an image, such as the face image 104, as input and produce an indication, such as a flag or numerical value, of whether the image likely depicts a face as output 110. The indication can be produced based on, e.g., the amount of skin tone detected in the image relative to the image size. Further, the output 110 can represent a confidence level that the image includes a face. The confidence level can be based on any range of values.

The input to the skin tone detection processor 108 can be a single image substantially depicting only a region corresponding to a detected face (e.g., the face image 104 extracted from the original image 102). Alternatively, the skin tone detection processor 108 can receive as input a full image including depictions of one or more faces and one or more locations corresponding to the regions in which a face was detected. In some implementations, the skin tone detection processor 108 can receive as input multiple images extracted from the same original image. The skin tone detection processor 108 can be configured to use additional information provided by the full image or multiple images to improve the accuracy of the skin tone detection (e.g., comparing color signatures across the full image, or comparing brightness across the multiple images).

The skin tone detection processor 108 can produce as output 110 an indication of whether an input image likely depicts a face. The indication can be based on the amount of skin tone detected in the input image or portion thereof. In some implementations, the output 110 can be Boolean and can indicate whether a certain threshold for detected skin tone was reached (e.g., "Accept" or "Reject"). In other implementations, the output 110 can correspond to a confidence level or numerical value, as described with respect to FIG. 2.

In operation, the face image 104 and the foliage image 106 can be input into a skin tone detection processor 108. The images can be input into the skin tone detection processor 108 sequentially or simultaneously. Based on the detection of skin tone in the face image 104, the skin tone detection processor 108 can output 110 an "Accept" indication 112. In contrast, based on detecting an absence of skin tone in the foliage image 106, the skin tone detection processor 108 can output 110 a "Reject" indication 118.

Figure 2:
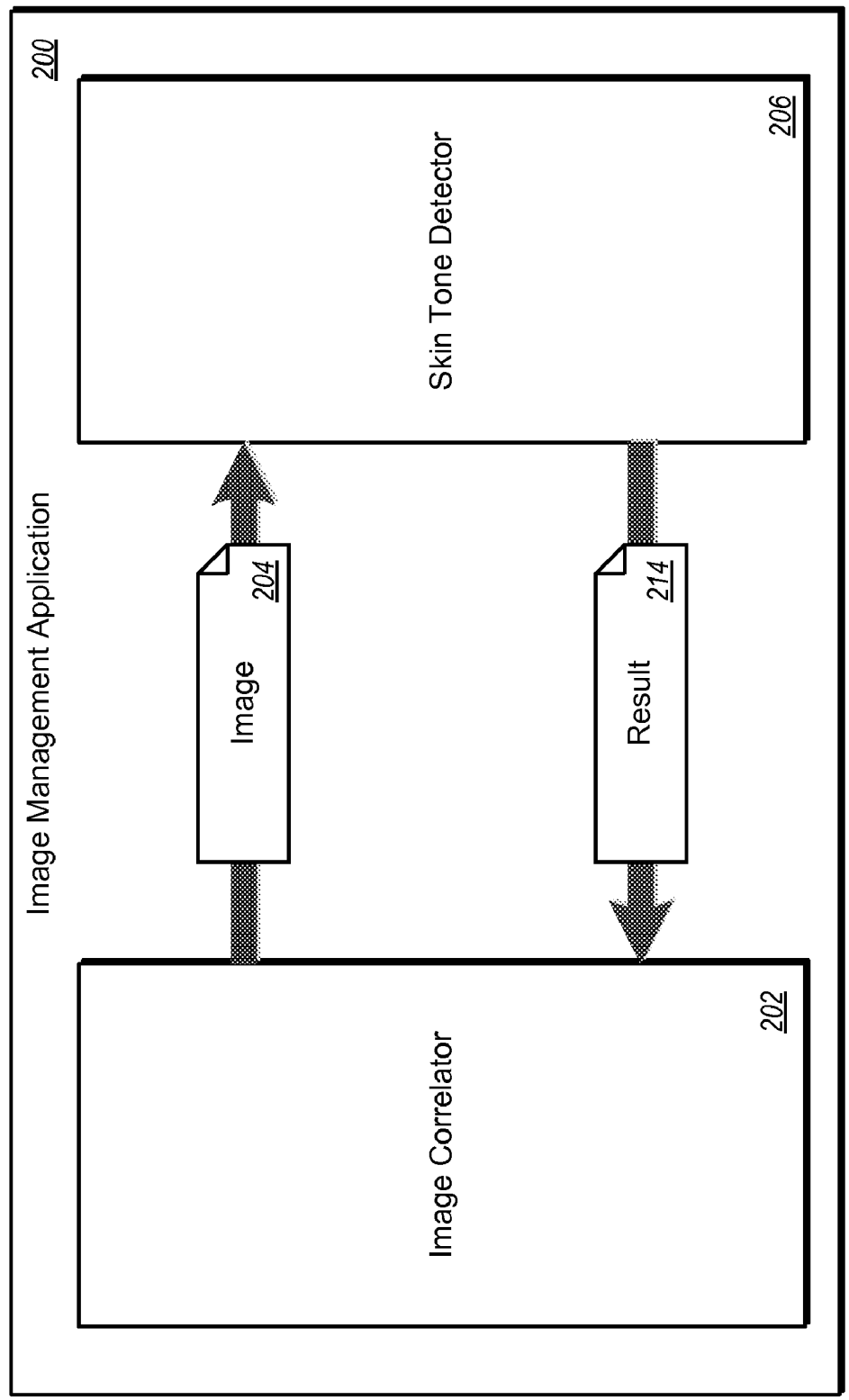
FIG. 2 shows an exemplary image management application for detecting skin tone.

In general, as shown in FIG. 2, a system can include a component that receives as input an image and generates a result indicating whether skin tone was detected in the image.

FIG. 2 shows an exemplary image management application 200 for detecting skin tone. The image management application 200 can be a software application executing on a computer system. The image management application 200 can access resources of the computer system (e.g., memory or disk storage) via an operating system or application platform. The image management application 200 can include a user-interface through which the image management application 200 receives input from a user and displays output to the user. Although shown as a single application, in some implementations the functionality of the image management application 200 can be accomplished using multiple applications.

The image management application 200 can include software systems or modules, such as an image correlator 202 and a skin tone detector 206. The image management application 200 also can enable software components to exchange information. The software components can be independent processes (e.g., threads) operating within the image management application 200, remote functions (e.g., invoked using a remote procedure call), or local functions (e.g., methods or procedures) called by a control process of the image management application 200.

An image correlator 202 can be an application, process, or system component configured to correlate images. For example, the image correlator 202 can correlate images of a same individual using facial detection and facial recognition functionality. Further, the image correlator 202 can, e.g., have confidence levels for the facial detection and the facial recognition functions. As part of assessing a confidence level, the image correlator 202 can use reliability indications (e.g., an output result 214 generated by the skin tone detector 206).

The skin tone detector 206 can be an application, process, system component, or combination thereof configured to detect skin tone in an image (e.g., the input image 204). The skin tone detector 206 further can produce the output result 214 indicating the result of skin tone detection.

An input image 204 represents a digital image. The input image 204 can be data stored in memory or a file system according to a format (e.g., bitmap, pixmap, vector graphics, compressed, or uncompressed). The input image 204 can be transferred from the image correlator 202 to the skin tone detector 206, e.g., by value or by reference. Transferring by value can include copying the input image 204 to an area of memory for use by the skin tone detector 206. Transferring by reference can include passing only a reference (e.g., a memory or file pointer) for the image data to the skin tone detector 206. The skin tone detector 206 can thus access the image from a location common to the image correlator 202.

In some implementations, the input image 204 can correspond to a proposed facial detection made by the image correlator 202, the image management application 200, or component thereof. In other implementations, the input image 204 can correspond to an original image including one or more such proposed facial detections. The one or more proposed facial detections can be coordinates relative to the original image of, e.g., rectangular regions including the proposed facial detections, or facial feature (e.g., eyes, nose, or mouth) locations. In still other implementations, the input image 204 can be one or more images corresponding to one or more such proposed facial detections in an original image.

In implementations in which the input image 204 corresponds to an original image, the skin tone detector 206 can be adapted to use the original image to improve the accuracy of skin tone detection in proposed facial detections and the rejection of proposed facial detections depicting non-face objects (e.g., leaves or clouds). In a first example, the skin tone detector 206 can examine other regions of the original image of similar size and shape as the proposed facial detection to assess whether the other regions have similar color to the proposed facial detection. If an original image includes many more regions with similar color, and specifically regions not proposed as facial detections, the skin tone detector 206, e.g., can determine the facial detection is less likely to be accurate or more strictly scrutinize the facial detection. Thus, the skin tone detector 206 can evaluate the consistency between the number of proposed facial detections in an image and a color comparison of the proposed facial detections to image areas not corresponding to proposed facial detections. In a second example, the skin tone detector 206 can examine a region of the original image of similar size and shape as a facial detection but offset from the facial detection to the left, right, top or bottom by half the region size. If the examined region has substantially the same color tone as the facial detection region, the skin tone detector 206 can more strictly scrutinize the facial detection or reject the facial detection.

In implementations in which the input image 204 includes one or more images corresponding to one or more such proposed facial detections in an original image, color information from the proposed facial detections together can improve the accuracy of skin tone detection for the individual proposed facial detections. For example, one or more test color spaces used in skin tone detection, as discussed relative to FIGS. 5 and 6, can be adapted to the particulars of the proposed facial detections. Similar lighting conditions, for instance, can affect the appearance of skin of multiple individuals in a single image.

An output result 214 is an indication of the skin tone relative to the input image 204, a sample thereof, or a facial detection in the input image 204. For example, the output result 214 can be a Boolean indication of whether to accept or reject the proposed facial detection (e.g., true for accept and false for reject). The indication can be based on whether a certain threshold for detected skin tone is reached (e.g., more than 50%, 75%, or 90% of the pixels corresponding to skin tone). Alternatively, the output result 214 can be a numerical value. For example, the output result 214 can indicate how likely the input image is to represent human skin, such as based on a value range. On the other hand, the output result 214 can represent the distance, e.g., with respect to a color space, between the input image's (or sample's) colors and the closest skin tone colors that correspond to human flesh.

Figure 3:
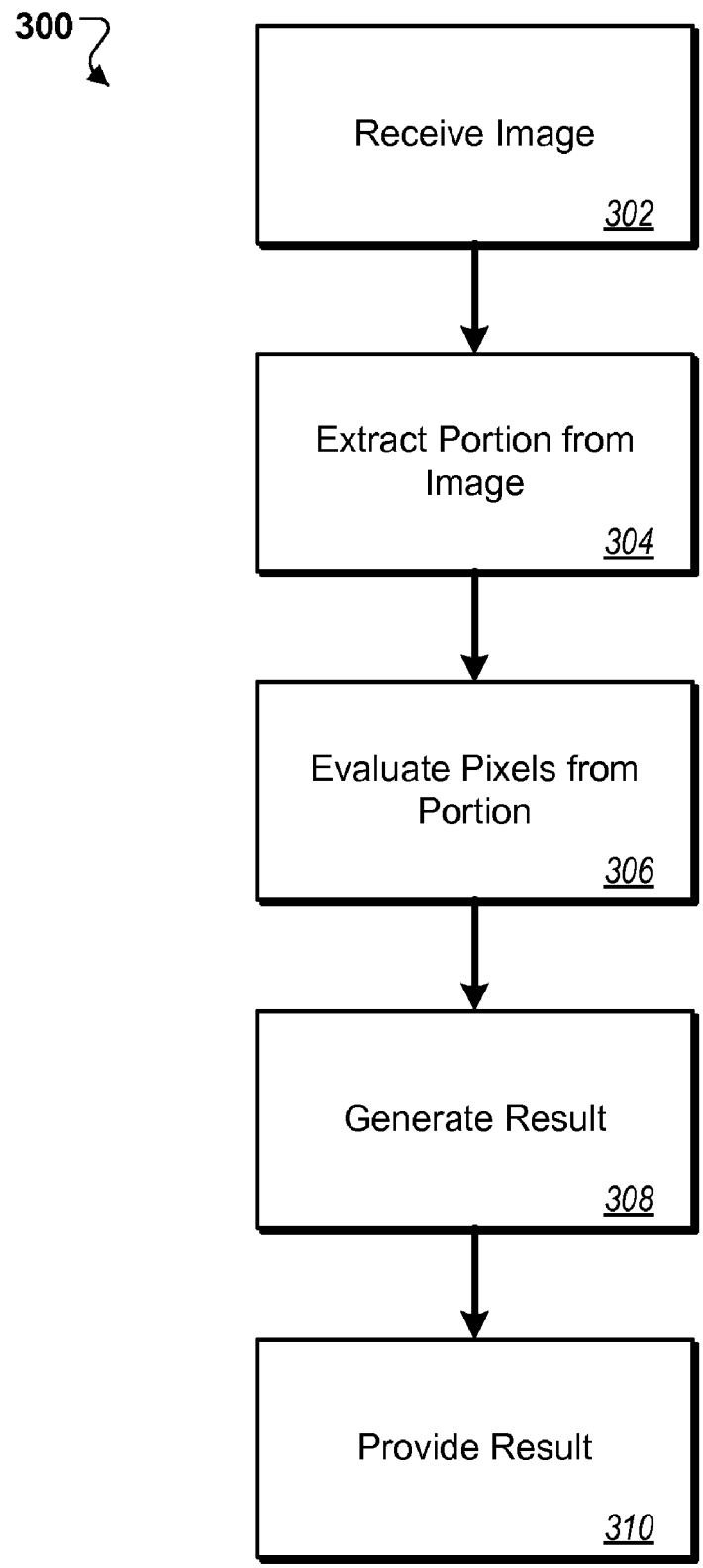
FIG. 3 is a flowchart showing an exemplary overall process for detecting skin tone.

In general, as shown in FIG. 3, skin tone in an image can be detected to determine whether the image likely represents skin. Detecting skin tone can include sampling the image and evaluating the pixels in the sampled portion individually to determine overall whether the pixels represent skin tone. The result of the detection can be provided to a requesting component (e.g., the image correlator 202), application or system.

FIG. 3 is a flowchart showing an exemplary process 300 for detecting skin tone. A skin tone detection processor can be configured to detect skin tone in an image, such as an image in which one or more faces have been detected. The images can include face-like patterns which correspond to faces of people or other objects (e.g., rocks or tree bark). Further, the skin tone detection processor can be configured to detect skin tone in a variety of lighting and filter (e.g., sepia) conditions. Additionally, the skin tone detection processor can be configured to detect skin tone representing various types of pigmentation. The skin tone detection processor can receive an image (302). For example, an application (or component thereof) associated with the skin tone detection processor can call the skin tone detection processor and transfer the image to the skin tone detection processor. The skin tone detection processor can receive the image (302) as part of the call and the transfer can be by reference (e.g., passing a pointer to a memory location of the image) or by value (e.g., passing the image as data stored in memory).

The skin tone detection processor can extract a portion from the received image (304). The extraction can be performed as described with reference to FIG. 4. Extracting the portion can include selecting a portion, copying a portion, or referring to a portion of the image. The portion can be, e.g., a specific region of the image. Alternatively, the portion can include individual pixels distributed throughout the image or pixels located within one or more specific portions of the image. In a first example, the portion can be rectangular and based on either or both of a size of the image (e.g., ⅓ the width and ⅓ the height of the image) and an angle of a face depicted in the image (e.g., relative to the image coordinates). The portion can be substantially centered relative to the image, centered but offset to below center, or situated in another location. In a second example, the portion can be every $n^{th}$ pixel in a region, such as the rectangular region described in the first example. In a third example, the portion can be selected based on the color, brightness, or other characteristic of the pixels (e.g., all pixels within a brightness range). Any methodology can be used to select the portion.

The skin tone detection processor can evaluate pixels from the extracted portion (306) to determine whether the pixels correspond to skin tone colors. The evaluation can be performed as described relative to FIGS. 5 and 6. Evaluating pixels can include iterating through some or all of the pixels in the portion and individually considering the pixels. A pixel can be converted to one or more color spaces and analyzed to determine whether the pixel corresponds to a skin tone. The skin tone detection processor can maintain information about the overall portion based on the evaluation of the individual pixels. For example, the skin tone detection processor can count the number of pixels in the portion and the number of pixels corresponding to a skin tone. Based on the information, the skin tone detection processor can determine whether the pixels overall correspond to skin tone colors. For example, the skin tone detection processor can compare the number of skin tone pixels to the total number of pixels to make the determination.

Based on the determination, the skin tone processor can generate a result (308) that provides a confidence level regarding whether the image received (302) depicts skin. The result can consequently indicate whether the image is more or less likely to depict a face.

The skin tone detection processor can provide the result (310) to an image management application (e.g., the image management application 200 shown in FIG. 2) or a component thereof (e.g., the image correlator 202 shown in FIG. 2). Providing the result (310) can include transferring a numerical value representing the determination result or other indication regarding the determination result (e.g., an "accept" or "reject" indication).

Figure 4:
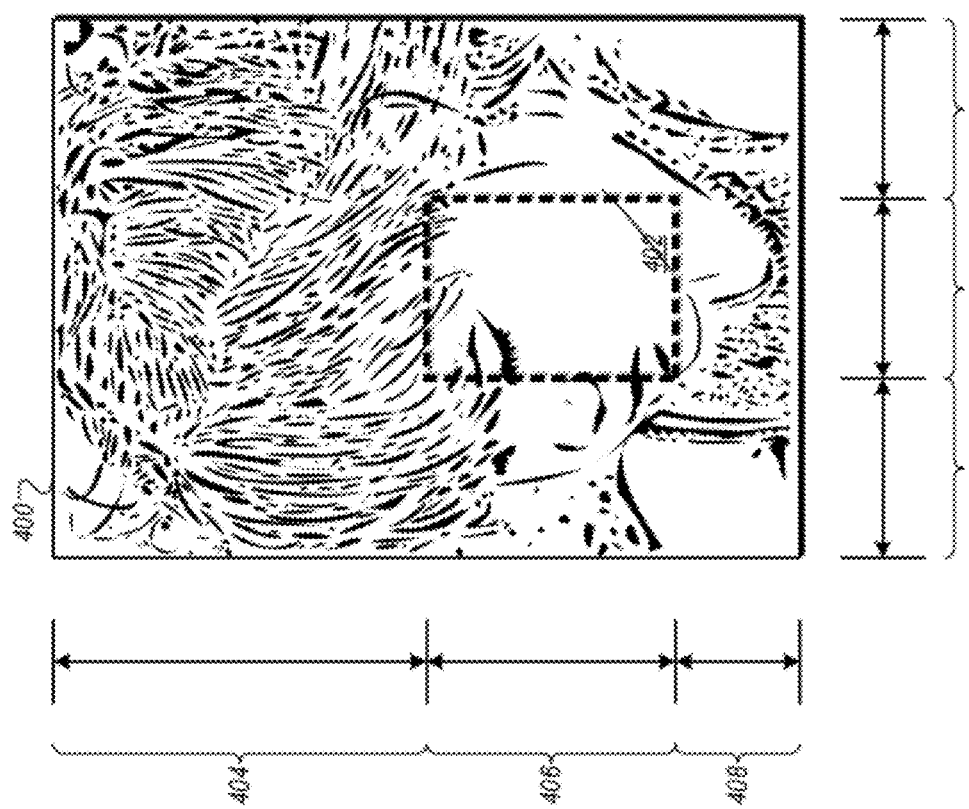
FIG. 4 is a diagram showing an exemplary extraction of a sample portion of an image.

In general, as shown in FIG. 4, a sampled portion from an image can be used in detecting skin tone. Images of faces can include skin tone elements (e.g., skin of a face) and non-skin tone elements (e.g., hair, hats, sunglasses, clothing, foliage, etc.). Using a portion of an image for skin tone detection can improve the detection accuracy by maximizing skin tone elements while minimizing non-skin tone elements.

FIG. 4 is a diagram showing an exemplary extraction of a sample portion 402 from an image 400. An image 400 can depict a face (e.g., a face of a young girl). Although the image 400 depicts a face, the image 400 can include elements not corresponding to skin tone, such as background and clothing. The accuracy of a skin tone detection process that evaluates whether pixels correspond to skin tone colors can be improved by selecting a sample portion 402 from the image 400 that will be more likely to include pixels corresponding to a facial region. For example, based on a facial detection process, images substantially representing only a face can be produced. In one example, the images can be rectangular. The rectangular images, despite wide variations in lighting, face angle, size, and non-facial image data, can consistently include pixels representing skin tone colors in one or more particular regions that can be sampled.

The sample portion 402 can be rectangular in shape. In other implementations, the sample portion 402 can be another shape (e.g., a triangle or circle). The sample portion 402 can have the same aspect ratio as the image 400. The sample portion 402 alternatively can have a fixed aspect ratio (e.g., 3:4) irrespective of the aspect ratio of the image 400. The sample portion 402 can be sized proportionately to the image 400. For example, the width 412 of the sample portion 402 can be a quarter or third of the width of the image 400. Similarly, the height 406 of the sample portion 402 can be a quarter or third of the height of the image 400. The proportion of the width 412 of the sample portion 402 relative to the image 400 can be the same or different than the proportion of the height 406 of the sample portion 402 relative to the image 400. Alternatively, the size and shape of the sample portion 402 can depend on the depictions of the image 400. For example, the shape of the sample portion 402 can correspond to a two-dimensional projection of a rectangle rotated in three-dimensional space according to the angle of a face depicted in the image 400.

The sample portion 402 can be positioned horizontally approximately in the center of the image 400. Thus, the distance 410 from the left edge of the image 400 to the left edge of the sample portion 402 can be approximately equal to the width 412 of the sample portion and the distance 414 from the right edge of the sample portion 402 to the right edge of the image 400.

Furthermore, the sample portion 402 can be positioned vertically approximately in the center of the image 400. Thus, the distance 404 from the top edge of the image 400 to the top edge of the sample portion 402 can be approximately equal to the height 406 of the sample portion 402 and the distance 408 from the bottom edge of the sample portion 402 to the bottom edge of the image 400 (not shown). Alternatively, the sample portion 402 can be offset to below center such that the distance 404 from the top of sample portion 402 to the top of the image 400 is greater than the distance 408 from the bottom of the sample portion 402 to the bottom of the image 400.

Figure 5:
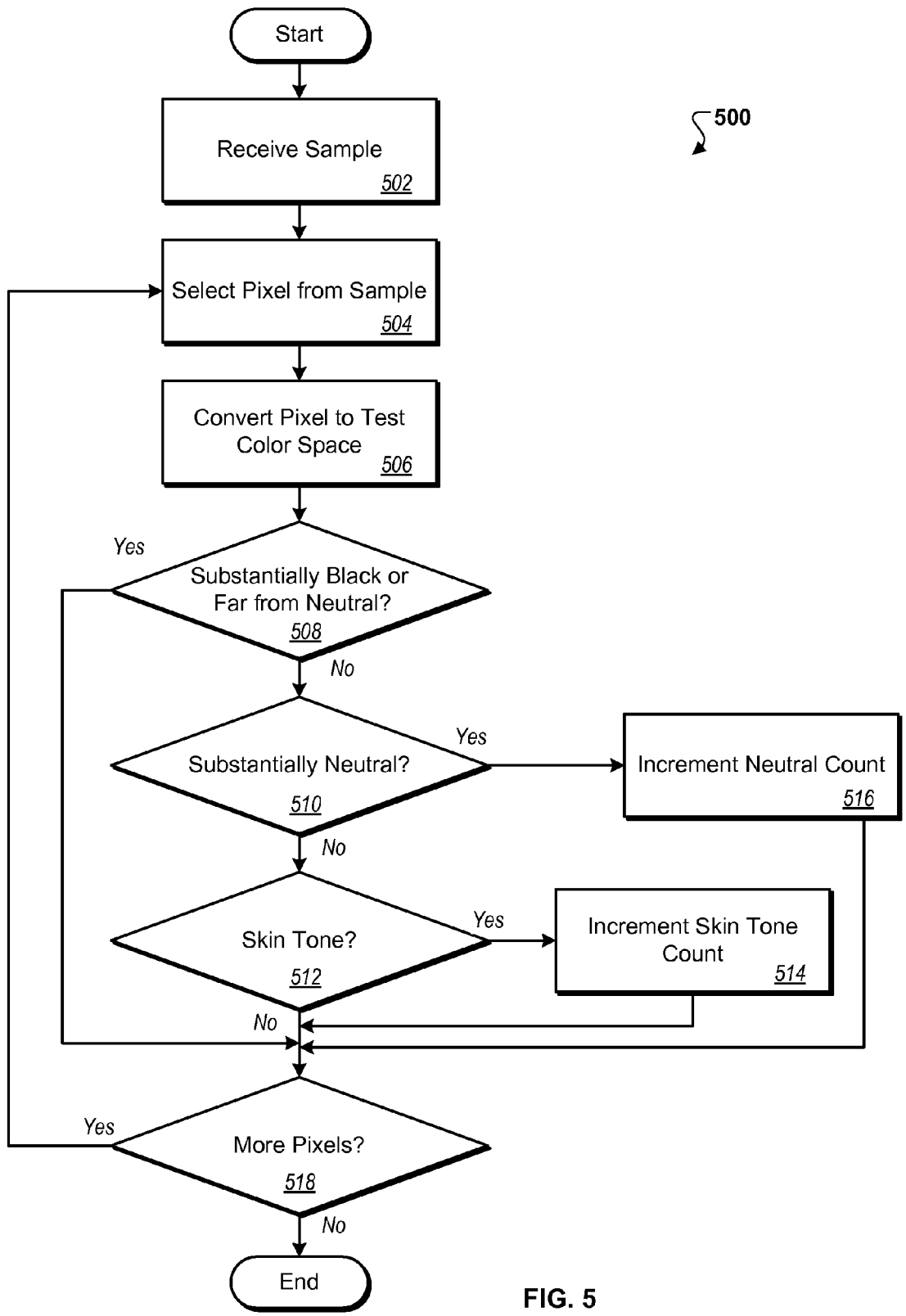
FIG. 5 is a flowchart showing an exemplary process for detecting skin tone in a sample portion of an image.

In general, as shown in FIG. 5, pixels from a sample portion of an image can be evaluated as part of detecting whether the sample portion represents skin tone. The process 500 can include individually considering pixels, converting pixels from an original color space to one or more test color spaces, checking for various conditions, and maintaining a count of skin tone pixels.

FIG. 5 is a flowchart showing an exemplary process 500 for detecting skin tone in a sample portion of an image. A skin tone detection processor can be configured to detect skin tone in samples from images, such as images in which faces have been detected. The samples can be portions of images likely to include skin tone pixels. Further, the skin tone detection processor can be configured to detect skin tone in a variety of lighting conditions and for various types of pigmentation. The skin tone detection processor can receive a sample portion (502). For example, an application (or component thereof) associated with the skin tone detection processor can call the skin tone detection processor and transfer the sample portion to the skin tone detection processor. The skin tone detection processor can receive the sample portion (502) as part of the call and the transfer can be by reference or by value. The skin tone detection process 500 also can be part of a larger process having access to the image and the sample portion (e.g., the process 300 shown in FIG. 3) thus obviating the need to transfer the sample portion.

The skin tone detection processor can select a pixel from the sample portion (504). Selecting a pixel can involve individually considering pixels in the sample portion through an iterative process. For example, the pixels in a sample portion can be loaded into a buffer represented as an array. Using a loop, the skin tone detection processor can execute a pass of the loop for pixels in the sample portion. The skin tone detection processor can select (504) each pixel in the sample portion or a subset of the pixels in the sample portion (e.g., every other or every third pixel).

Pixels in the sample portion can be represented with varying numbers of bits. For example, pixel colors can be four-dimensional and thus have four components, such as red, green, blue and transparency. The components can be represented by, e.g., 4, 8, or 16 bits. Thus, each pixel can be represented by, e.g., 16, 32 or 64 bits in total. Similarly, pixel colors can be three dimensional and have three components (e.g., red, green and blue (RGB) or hue, saturation and lightness (HSL)).

The skin tone detection processor can evaluate whether a pixel color is skin tone in various test color spaces. The pixel color selected from the sample portion can be associated with an original color space and then converted (506) to one or more test color spaces. Converting from an original color space to a test color space can simplify the evaluation of whether a pixel is skin tone. Converting also can improve the accuracy of the evaluation. Converting a pixel color to multiple test color spaces also can allow comparison between and combination of test results using the multiple test color spaces. For example, a pixel color can be converted to a first test color space adapted to improve the accuracy of positive skin tone detection but in which false positive skin tone detection also can occur. Testing the pixel color in a second test color space can corroborate the test result in the first test color space, or indicate a likelihood of results in the first test color space representing falsely positive skin tone detection.

Furthermore, the skin tone detection processor can convert the selected pixel (506) from a three-dimensional (e.g., RGB) or four-dimensional (e.g., RGB with transparency, or cyan, magenta, yellow, and key (CMYK)) original color space to a one-, two-, or three-dimensional test color space. For example, a two-dimensional test color space, such as red-green (R-G) or red-blue (R-B), can provide accurate and efficient skin tone detection.

Pixels can be converted from an original color space to a test color space using a variety of techniques. For example, to convert from a four-dimensional color space to a three-dimensional color space, one pixel component, such as transparency, can be ignored. Alternatively, a transparency component can be equated with white and mixed with the other color components to convert from a four-dimensional color space to a three-dimensional color space.

To convert from a three-dimensional color space to a two-dimensional color space, a variety of techniques also can be used. In some implementations, one of the three components can be ignored. In other implementations, a pixel in a three-dimensional color space (e.g., RGB) can be converted to a different three-dimensional color space (e.g., HSL space) and one of the three components (e.g., lightness) can then be ignored. In still other implementations, the skin tone detection processor can divide one color component of a pixel by the pixel's luminosity.

Luminosity can be calculated in various ways. Where R represents a red component of a pixel color, G represents a green component, and B represents a blue component, the luminosity (L) can be calculated using the formula:

$$L = (0.299 \times R) + (0.587 \times G) + (0.144 \times B).$$

Alternatively, luminosity can be calculated using the formula:

$$L = R + G + B.$$

In other implementations, assuming a max operation selects the largest value from a list of values and a min operation selects the smallest value from a list of values, luminosity can be calculated using the formula:

$$L = \frac{1}{2} \times (\max(R, G, B) + \min(R, G, B)).$$

In two-dimensional color space, each pixel can have two components. For example, pixels in R-G color space (or R-G space) can have a red and a green component, or in R-B color space, a red and a blue component. If a pixel is converted (506) to an R-G color space, the pixel's red component ($R_{new}$) can be calculated using the formula:

$$R_{new} = \frac{R}{L}.$$

The pixel's green component ($G_{new}$) can be calculated using the formula:

$$G_{new} = \frac{G}{L}.$$

Depending on the luminosity formula used, the new red and green components can be normalized such that the range of possible values for each component is 0.0-1.0. The red and green components also can be normalized after conversion.

In some implementations, the skin tone detection processor can determine whether a selected pixel is substantially black or far from neutral (508) or whether a selected pixel is substantially neutral (510) before converting the selected pixel to a test color space (506). In other implementations the skin tone detection processor can make these determinations after converting a selected pixel to a test color space (506).

In either case, the skin tone detection processor can determine whether a color of a selected pixel is substantially black or far from neutral (508). The determination can eliminate a pixel from further consideration that is very unlikely to correspond to skin tone or for which skin tone detection is unreliable. For example, a pixel that is substantially black can lead to unreliable skin tone detection. Because the pixel appears substantially black, the components of the pixel color (e.g., hue) can be substantially irrelevant visually and thus less carefully defined when an image is produced than for a pixel whose components are visually noticeable.

Furthermore, a pixel color which is far from neutral can be highly saturated and very unlikely to correspond to skin tone. A neutral color can be a color for which the color components are equal (e.g., R=G=B) and can appear to be black, gray, or white. A highly saturated color can be visually far from neutral colors. Saturation can be calculated or assessed using a variety of techniques. In a first example, highly saturated colors can correspond to a region of a two-dimensional color space such as represented in a coordinate system (e.g., such as the diagram shown in FIG. 6 of a color space coordinate system). A store of coordinates defining a polygonal region in the coordinate system can define highly saturated colors. The skin tone detection processor can determine whether a pixel color is far from neutral by assessing whether the color of the pixel is within the polygonal region. In a second example, saturation can be calculated using, e.g., two or three color components of a pixel. The components used can depend on whether the pixel is represented in two- or three-dimensional color space. In a three-dimensional color space, saturation (S) can be calculated using the formula:

$$S = \frac{\max(R, G, B) - \min(R, G, B)}{\max(R, G, B)}.$$

In a two-dimensional color space, saturation can be calculated using the formula:

$$S = \frac{\max(R, G) - \min(R, G)}{\max(R, G)}.$$

In a normalized two-dimensional color space in which luminosity has been removed (e.g., R-G space), saturation can be calculated using the formula:

$$S = \sqrt{\left(R - \frac{1}{3}\right)^2 + \left(G - \frac{1}{3}\right)^2}.$$

Such saturation formulas can provide a value representing the saturation from a minimum value to a maximum value (e.g., 0-255, or 0.0-1.0). If higher values (e.g., 255) represent high saturation, the skin tone detection processor can determine that pixels above a certain threshold (e.g., 240) are far from neutral (i.e., highly saturated).

If the skin tone detection processor determines (508) that a pixel color is substantially black or far from neutral, the skin tone detection processor can ignore the pixel and determine (518) whether more pixels need to be selected.

If, on the other hand, the skin tone detection processor determines that the pixel color is not substantially black and not far from neutral, the skin tone detection processor can determine (510) whether the pixel color is substantially neutral. As mentioned, a neutral color can be a color for which the color components are equal (e.g., R=G=B) and can appear to be black, gray, or white. A pixel color that is substantially neutral can result from an input image, and therefore a sample portion of the input image, having a grayscale color signature. In such an image, and portions thereof, substantially all pixels can have a similar characteristic of being substantially neutral. Grayscale images lack color information and therefore can be unsusceptible to skin tone detection. In addition, neutral colors can be uncharacteristic of human skin and therefore not recognized as skin tone. In addition to grayscale, the skin tone detection processor in some implementations can be configured to detect other artificial color signatures (e.g., sepia). Because other artificial color signatures may prevent accurate skin tone detection, detection of such signatures can allow a processor to provide output indicating, e.g., that no information can be provided about the image through skin tone detection or that the image passes (i.e., is accepted by) a skin tone evaluation.

The skin tone detection processor can determine that a color of a pixel is neutral (510), and increment a neutral count (516). The neutral count can be a number representing the pixels in a sample portion which are substantially neutral. The neutral count can be used when all the pixels in a sample portion have been evaluated to determine, e.g., that the sample portion is grayscale. For example, the neutral count can be divided by the total pixels in an image to generate a percentage. High percentages (e.g., 95-100%) can indicate that the sample portion is likely grayscale. The accuracy of the determination that the sample portion is grayscale can be improved by evaluating the sampled image (i.e., the image from which the sample portion was taken) or other sample portions taken from the same sampled image. After the neutral count is incremented, the skin tone detection processor can determine whether more pixels remain to be evaluated (518) as will be discussed below.

Figure 6:
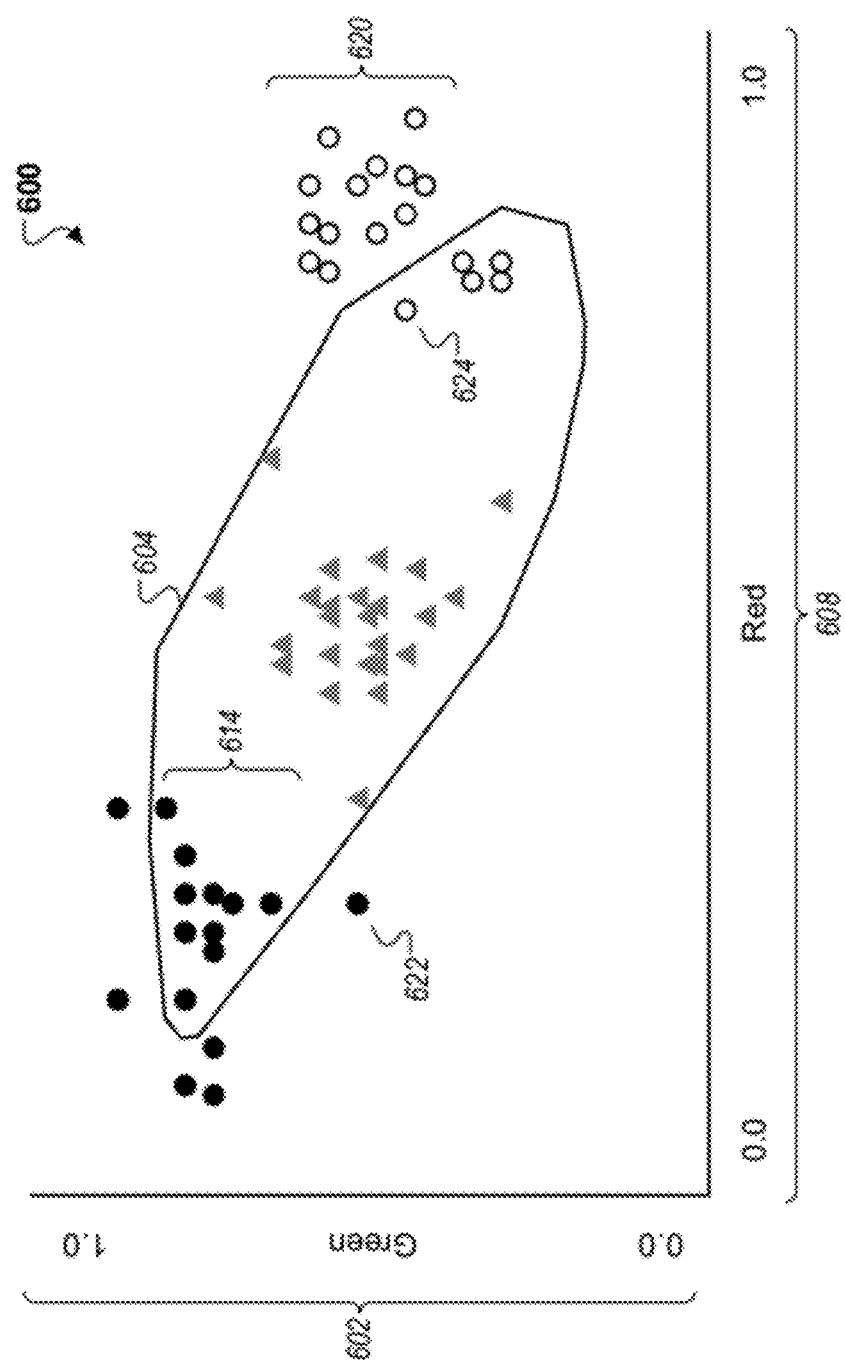
FIG. 6 is a diagram showing an exemplary skin tone region of a color space.

If the skin tone detection processor determines (510) that a pixel color is not near neutral, the skin tone detection processor can evaluate whether the pixel corresponds to skin tone (512). The determination can involve delineating in a color space a polygonal region associated with skin tone. The polygonal region can be defined empirically, analytically or in another manner (e.g., based on objectives of the skin tone detection). For example, the polygonal region can include the overwhelming majority of face-sampled colors based on empirical studies of images including faces. The polygonal region can be delineated in R-G space as shown in FIG. 6. The skin tone detection processor can determine a pixel color is skin tone by assessing whether the pixel color is located inside the polygonal color space region.

The skin tone detection processor can increment a skin tone count (514) if the pixel color is inside the polygonal region. If the pixel color is outside the polygonal region, the skin tone detection processor can skip incrementing the skin tone count. In this manner, when all the pixels have been evaluated, a percentage of skin tone pixels to total pixels can be produced. It can be determined, based on the percentage being higher than a given threshold (e.g., 50%, 75% or 90%) that the sample portion overall, and the image, depict skin.

Alternatively, in some implementations, a skin tone detection processor can determine whether a pixel is skin tone by determining a distance of the pixel color from a skin tone line or skin tone polygonal region in a color space. Rather than incrementing a skin tone count, the distance of each pixel from the line or polygonal region can be summed or averaged to produce an overall distance from skin tone. The overall distance can be used to determine whether a sample portion overall represents skin tone.

In some implementations, the accuracy of evaluating whether a pixel corresponds to skin tone can be improved by using metadata relating to the image. For example, Global Positioning System (GPS) information or information conforming to the Exchangeable image file format (Exif) specification associated with the image can be used to determine the time of day and location where an image was captured. The metadata can be used to subjectively adjust the delineated skin tone region of the color space to accommodate the circumstances associated with an image (e.g., adjusting the region to account for dark tones in images captured with a camera at night).

After incrementing the skin tone count, the skin tone detection processor can determine (518) whether pixels remain to be evaluated. For example, the skin tone detection processor can determine a progress through the pixels in a memory representation (e.g., an array) of the sample portion. If all the pixels to be evaluated in a sample portion have been evaluated, the skin tone processor can end the process 500 of evaluating sample portion pixels. If the skin tone detection processor, on the other hand, determines (518) that pixels remain to be evaluated, the skin tone detection processor can select the next pixel to be evaluated from the sample portion (504).

In general, as shown in FIG. 6, a polygonal region in a color space can be delineated to define skin tone. A skin tone detection processor can evaluate whether the colors of pixels from an image (e.g., pixels in a sample portion of an image)

represent skin tone by ascertaining whether the pixel colors are inside or outside the polygonal region.

FIG. 6 is a diagram 600 showing an exemplary skin tone region 604 of a color space. The diagram 600 can include a two-dimensional, normalized R-G color space coordinate system representation. A point on the coordinate system can represent a color in the color space. A red and a green component of the color can be represented by the location of the point. In specific, a horizontal axis 608 can correspond to a red component of a color. The distance of a point, from left to right, can indicate the intensity of the color's red component. A point near the vertical axis can have a red component of lower intensity than a point further from the vertical axis. The vertical axis 602 can correspond to a green component of a color. The distance of a point, from bottom to top, relative to the vertical axis 602 can indicate the intensity of a color's green component. The potential values of the red and green components can be normalized such that the lowest possible intensity can be indicated by 0.0 and the highest possible intensity can be indicated by 1.0. For example, a pixel can have a green component of 1.0 and a red component of 1.0 in the R-G space. A point representing the color of the pixel can be located in the upper-right corner of the diagram 600.

The skin tone region 604 can be delineated using a polygonal region in R-G space. The size and shape of the skin tone region 604 can be established empirically. For example, images including actual skin depictions can be analyzed. The colors of pixels corresponding to skin tone can be stored. The stored results can be used to generate the skin tone region 604.

The skin tone region 604 can include the majority of face-sampled colors. The faces can correspond to individuals representing substantially all global skin tones. In some implementations, the skin tone region 604 can be established more narrowly such as to identify colors characteristic of one or more races. In other implementations, the size or shape of the skin tone region 604 can change based on further evaluations of images or based on user input. For example, in an image management application a user can identify faces of individuals not identified by the image management application. Based on the input and pixel colors of the identified faces, the skin tone region 604 can be adapted to more accurately detect the skin tone of faces identified by the user.

In some implementations, multiple skin tone regions, such as the skin tone region 604, can be used in combination or separately to delineate skin tone colors. In a first example, multiple skin tone regions can be used in combination by combining pixel color test results relative to the multiple skin tone regions. The multiple skin tone regions, e.g., can vary in strictness from more to less likely to represent skin tone colors. In a second example, multiple skin tone regions can be used separately by adaptively selecting one or more of the multiple skin tone regions, e.g., to use for a given image or a particular user. Based on, e.g., lighting conditions, similar facial pigmentation, or photographic effects across multiple sample portions taken from a sampled image, one or more appropriate skin tone regions from the multiple skin tone regions can be selected (e.g., a skin tone region appropriate for overexposed images can be used when multiple sample portions from a sampled image have similar overexposed characteristics). Using multiple skin tone regions can be adapted to more accurately detect skin tone in faces.

The points of varying shapes represented in the diagram 600 can correspond to pixel colors from sample portions of three images. Points represented as solid circles can correspond to a first sample portion, gray triangles can correspond to a second sample portion and hollow circles can correspond to a third sample portion.

With respect to the first sample portion, 16 exemplary pixel colors are represented as solid circles in the diagram 600. A group of pixel colors 614 is within the skin tone region 604. Some of the pixel colors (e.g., pixel color 622) are outside the skin tone region 604. Given a depiction of a face and skin tone in an image, some pixel colors from a sample portion of the image can be non-skin tone as a result of non-skin objects also being depicted (e.g., earrings, lipstick, glasses, clothing, food, etc.). Thus, a threshold can be used for the ratio of skin tone colors to non-skin tone colors in evaluating whether a sample portion depicts skin. For example, 10 of the 16 pixel colors, or 63% of the pixel colors, associated with the first sample portion are within the skin tone region 604. If a threshold is 90%, the first sample portion can be rejected as not depicting skin tone. However, in some implementations the evaluation of whether a sample portion represents skin tone can be performed by measuring the distance of each pixel color to the skin tone region 604. Given the close proximity of the first sample portion pixel colors to the skin tone region 604, it can be determined that the first sample portion does represent skin tone (e.g., and a face).

With respect to the second sample portion, all of the grey triangles, representing pixel colors, are within the skin tone region 604. Thus, it can be determined that the second sample portion represents skin tone.

With respect to the third sample portion, the majority of hollow circles 620, representing pixel colors, are outside the skin tone region 604. Some pixel colors (e.g., a hollow circle 624) are within the skin tone region 604. However, given the majority of hollow circles 620 are outside the skin tone region 604, it can be determined that the third sample portion does not represent skin tone.

Figure 7:
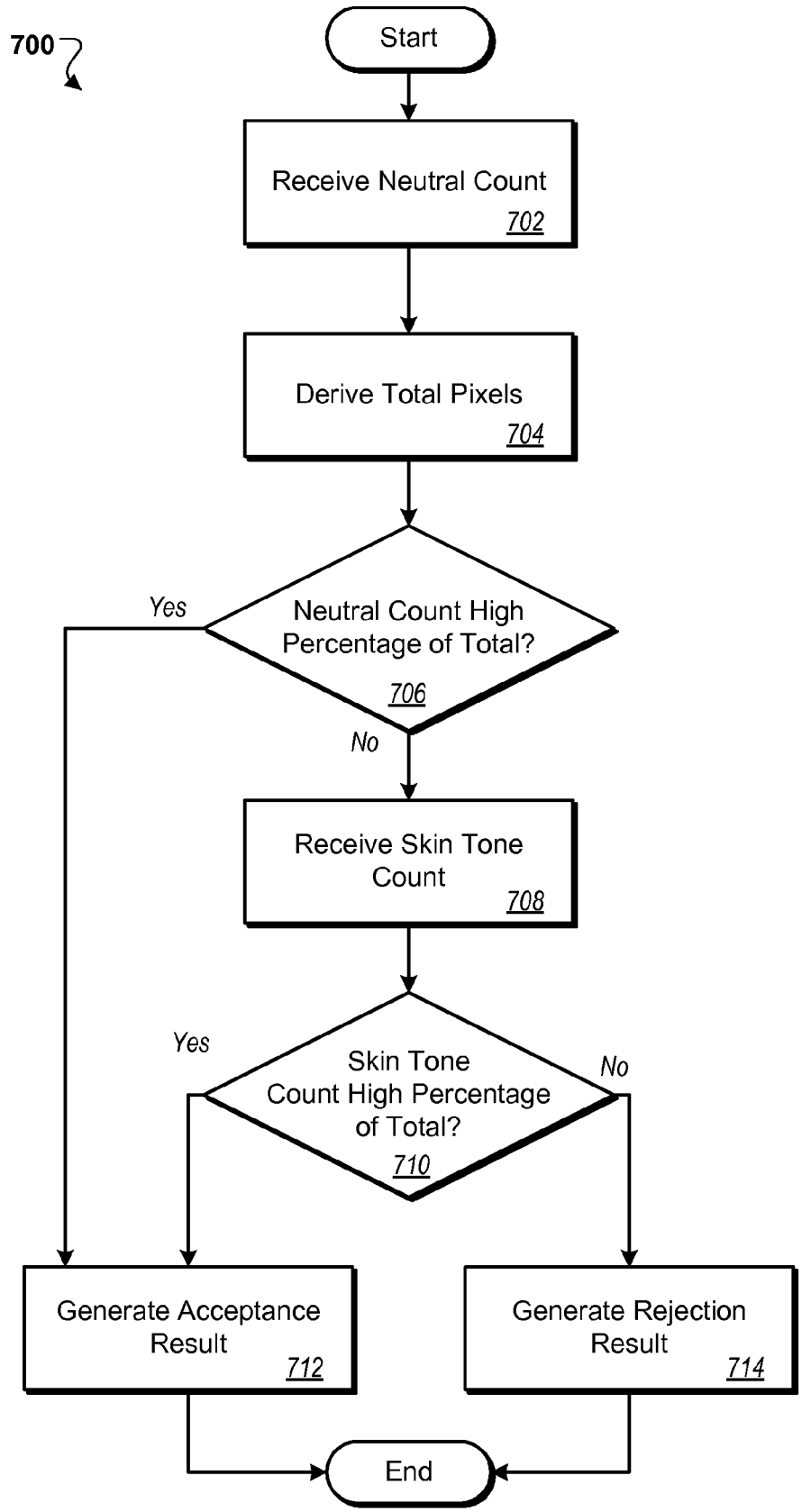
FIG. 7 is a flowchart showing an exemplary process for accepting or rejecting an image based on skin tone detection.

In general, as shown in FIG. 7, based on an evaluation of pixels from a sample portion (e.g., as shown in FIGS. 5 and 6), it can be determined whether the pixels overall represent skin tone. The determination can be used in combination with a facial detection to generate a result indicating the likelihood that a face was accurately detected. The process 700 shown in FIG. 7 can correspond to determining whether pixels represent skin tone (308) in the process 300 shown in FIG. 3.

FIG. 7 is a flowchart showing an exemplary process 700 for accepting or rejecting an image based on skin tone detection. A skin tone detection processor can be configured to determine whether information about pixels sampled from an image indicates the image represents skin tone. The information can include counts of pixels based on a classification of a pixel color (e.g., skin tone count or neutral count). In specific, the skin tone detection processor can receive a neutral count (702) of pixels evaluated to be substantially neutral. A neutral pixel can lack color (e.g., black, gray and white). The count of neutral pixels can be produced as part of evaluating pixels in a sample portion (e.g., determining whether a pixel color is substantially neutral (510) and incrementing a neutral count (516), as shown in FIG. 5).

The skin tone detection processor can derive the total number of pixels (704) in an image sample portion. The total pixels can be derived (704) by, e.g., multiplying a width by a height of the sample portion. Alternatively, the total pixels also can be derived (704) by ascertaining a size of a memory buffer in which the sample portion is stored.

The skin tone detection processor can determine (706) whether the neutral count represents a high percentage of the total pixels. The skin tone detection processor can calculate the percentage by dividing the neutral count by the total pixels. The skin tone detection processor can compare the percentage to a threshold designating a value considered to be "high" (e.g., 50%, 75%, or 95%).

If the skin tone detection processor determines (706) that the neutral count represents a high percentage of the total pixels, the skin tone detection processor can generate an acceptance result (712).

If, on the other hand, the skin tone detection processor determines (706) that the neutral count does not represent a high percentage of the total pixels, the skin tone detection processor can receive a skin tone count (708). The skin tone count can represent the number of pixels in a sample portion that correspond to skin tone. The skin tone count can be determined, e.g., as part of the process 500 shown in FIG. 5.

The skin tone detection processor can determine (710) whether the skin tone count represents a high percentage of the total pixels. The determination can involve dividing the skin tone count by the number of total pixels. The determination can be based on comparing the calculated percentage of skin tone pixels to a threshold percentage (e.g., 50%, 90% or 95%).

The skin tone detection processor can determine (710) that the skin tone count does not represent a high percentage of the total pixels, and can generate a rejection result (714). The skin tone detection processor also can determine (710) that the skin tone count represents a high percentage of the total pixels, and can generate an acceptance result (712).

In some implementations, rather than generating a Boolean acceptance (712) or rejection result (714), the skin tone detection processor can generate a value indicating, e.g., the percentage of pixels having skin tone color, or other value as discussed relative to FIG. 2.

A number of implementations have been disclosed herein. Nevertheless, it will be understood that various modifications may be made without departing from the spirit and scope of the claims. Accordingly, other implementations are within the scope of the following claims.

What is claimed is:

1. A computer-implemented method for detecting skin tone in an image, the method comprising:
    sampling an image that may depict a human face to generate a sample portion;
    evaluating pixels in the sample portion to generate a first determination whether the pixels are substantially neutral;
    evaluating pixels in the sample portion to generate a second determination whether the pixels correspond to skin tone colors;
    evaluating pixels in the sample portion to generate a third determination whether the pixels are substantially black or far from neutral;
    generating, based on the first, second, and third determinations, a skin tone result indicating a confidence level that the received image includes a depiction of human skin; and
    providing the skin tone result to an image management application to indicate a likelihood the image depicts a human face.

2. The computer-implemented method of claim 1, wherein sampling the image further comprises:
    identifying a region substantially one third as wide as the image, substantially centered horizontally relative to the image, substantially one third as tall as the image, and offset below vertically centered relative to the image.

3. The computer-implemented method of claim 1, wherein evaluating pixels further comprises:
    converting a selected pixel to a normalized red-green color space; and
    comparing the selected pixel to a predetermined skin tone region in the normalized red-green color space.

4. The computer-implemented method of claim 1, wherein evaluating pixels further comprises:
    generating a skin tone pixel count by comparing the pixels to a predetermined skin tone region in a color space.

5. The computer-implemented method of claim 4, wherein evaluating pixels further comprises:
    comparing the skin tone pixel count to a count of the pixels to generate a skin tone percentage; and
    determining, based on the skin tone percentage and a predetermined skin tone percentage threshold, that the sample portion includes a depiction of human skin.

6. The computer-implemented method of claim 1, wherein the generated skin tone result comprises an indication that the image is suitable for facial recognition processing.

7. The computer-implemented method of claim 1, wherein the received image comprises a facial-detection rectangle extracted from an original image.

8. The computer-implemented method of claim 1, further comprising:
    determining that the image is expressed in an artificially modified color environment; and
    generating a skin tone result indicating the artificially modified color environment.

9. The method of claim 1, wherein generating a skin tone result comprises:
    receiving a first count of neutral pixels in the sample portion;
    deriving second count of total pixels in the sample portion; and
    generating a skin tone result indicating that the received image includes a depiction of human skin if the first count exceeds a predetermined threshold percentage of the second count.

10. A non-transitory computer program product, tangibly encoded on a computer-readable medium, operable to cause data processing apparatus to perform operations comprising:
    sampling an image that may depict a human face to generate a sample portion;
    evaluating pixels in the sample portion to generate a first determination whether the pixels are substantially neutral;
    evaluating pixels in the sample portion to generate a second determination whether the pixels correspond to skin tone colors;
    evaluating pixels in the sample portion to generate a third determination whether the pixels are substantially black or far from neutral;
    generating, based on the first, second, and third determinations, a skin tone result indicating a confidence level that the received image includes a depiction of human skin; and
    providing the skin tone result to an image management application to indicate a likelihood the image depicts a human face.

11. The computer program product of claim 10, wherein sampling the image further comprises:
    identifying a region substantially one third as wide as the image, substantially centered horizontally relative to the image, substantially one third as tall as the image, and offset below vertically centered relative to the image.

12. The computer program product of claim 10, wherein evaluating pixels further comprises:
    converting a selected pixel to a normalized red-green color space; and
    comparing the selected pixel to a predetermined skin tone region in the normalized red-green color space.

13. The computer program product of claim 10, wherein evaluating pixels further comprises:
generating a skin tone pixel count by comparing the pixels to a predetermined skin tone region in a color space.

14. The computer program product of claim 13, wherein evaluating pixels further comprises:
comparing the skin tone pixel count to a count of the pixels to generate a skin tone percentage; and
determining, based on the skin tone percentage and a predetermined skin tone percentage threshold, that the sample portion includes a depiction of human skin.

15. The computer program product of claim 10, wherein the generated skin tone result comprises an indication that the image is suitable for facial recognition processing.

16. The computer program product of claim 10, wherein the received image comprises a facial-detection rectangle extracted from an original image.

17. The computer program product of claim 10, the operations further comprising:
determining that the image is expressed in an artificially modified color environment; and
generating a skin tone result indicating the artificially modified color environment.

18. The computer program product of claim 10, wherein the computer program product is operable to cause data processing apparatus to perform operations further comprising:
omitting evaluating pixels to generate the first determination and evaluating pixels to generate the second determination if the pixels correspond to substantially black or saturated colors.

19. The computer program product of claim 10, wherein generating a skin tone result comprises:
receiving a neutral count;
deriving a total pixel count; and
generating a skin tone result indicating that the received image includes a depiction of human skin if the neutral count exceeds a predetermined threshold percentage of the total pixel count.

20. A system comprising:
an image management application; and
one or more computers operable to execute the image management application and to perform operations comprising:
sampling an image that may depict a human face to generate a sample portion;
evaluating pixels in the sample portion to generate a first determination whether the pixels are substantially neutral;
evaluating pixels in the sample portion to generate a second determination whether the pixels correspond to skin tone colors;
evaluating pixels in the sample portion to generate a third determination whether the pixels are substantially black or far from neutral;
generating, based on the first, second, and third determinations, a skin tone result indicating a confidence level that the received image includes a depiction of human skin; and
providing the skin tone result to the image management application to indicate a likelihood the image depicts a human face.

21. The system of claim 20, wherein sampling the image further comprises:
identifying a region substantially one third as wide as the image, substantially centered horizontally relative to the image, substantially one third as tall as the image, and offset below vertically centered relative to the image.

22. The system of claim 20, wherein evaluating pixels further comprises:
converting a selected pixel to a normalized red-green color space; and
comparing the selected pixel to a predetermined skin tone region in the normalized red-green color space.

23. The system of claim 20, wherein evaluating pixels further comprises:
generating a skin tone pixel count by comparing the pixels to a predetermined skin tone region in a color space.

24. The system of claim 23, wherein evaluating pixels further comprises:
comparing the skin tone pixel count to a count of the pixels to generate a skin tone percentage; and
determining, based on the skin tone percentage and a predetermined skin tone percentage threshold, that the sample portion includes a depiction of human skin.

25. The system of claim 20, wherein the generated skin tone result comprises an indication that the image is suitable for facial recognition processing.

26. The system of claim 20, wherein the received image comprises a facial-detection rectangle extracted from an original image.

27. The system of claim 20, the operations further comprising:
determining that the image is expressed in an artificially modified color environment; and
generating a skin tone result indicating the artificially modified color environment.

28. The system of claim 20, wherein generating a skin tone result comprises:
receiving a first count of neutral pixels in the sample portion;
deriving second count of total pixels in the sample portion; and
generating a skin tone result indicating that the received image includes a depiction of human skin if the first count exceeds a predetermined threshold percentage of the second count.

* * * * *